US012619842B1

(12) United States Patent
Li et al.

(10) Patent No.: US 12,619,842 B1
(45) Date of Patent: May 5, 2026

(54) RFID FINISHED FOOTWEAR QUALITY MANAGEMENT SYSTEM AND METHOD

(71) Applicant: Shanghai Easement Electric Co., Ltd., Shanghai (CN)

(72) Inventors: Fang Li, Shanghai (CN); Linlin Lu, Shanghai (CN); Jun Liu, Shanghai (CN)

(73) Assignee: Shanghai Easement Electric Co., Ltd., Shanghai (CN)

( * ) Notice: Subject to any disclaimer, the term of this patent is extended or adjusted under 35 U.S.C. 154(b) by 0 days.

(21) Appl. No.: 19/356,003

(22) Filed: Oct. 10, 2025

(30) Foreign Application Priority Data

Jul. 8, 2025 (CN) .......................... 202510935373.6

(51) Int. Cl.
*G06K 7/10* (2006.01)
(52) U.S. Cl.
CPC ................................ *G06K 7/10366* (2013.01)

(58) Field of Classification Search
CPC ................................................. G06K 7/10366
See application file for complete search history.

(56) References Cited

U.S. PATENT DOCUMENTS 11,294,091 B1 * 4/2022 Tseng .................... G01V 3/081

* cited by examiner

*Primary Examiner* — Jamara A Franklin
(74) *Attorney, Agent, or Firm* — Westbridge IP LLC

(57) ABSTRACT
An RFID finished footwear quality management system includes a footwear needle detector module, configured to identify RFID tag information of each shoe or each pair of shoes, and perform metal detection to obtain a detection result and a detection time; a small package verification module, configured to read RFID tag information of a pair of shoes, tongue tag information, and inner shoe box barcode information, and bind the RFID tag information of the pair of shoes, the tongue tag information, and the inner shoe box barcode information; and a packaging box needle detector module, configured to scan an outer box code to record packaging box label information, read RFID tag information of each shoe or each pair of shoes within a packaging box.

10 Claims, 8 Drawing Sheets

Footwear needle detector module 100

Small package verification module 200

Packaging box needle detector module 300

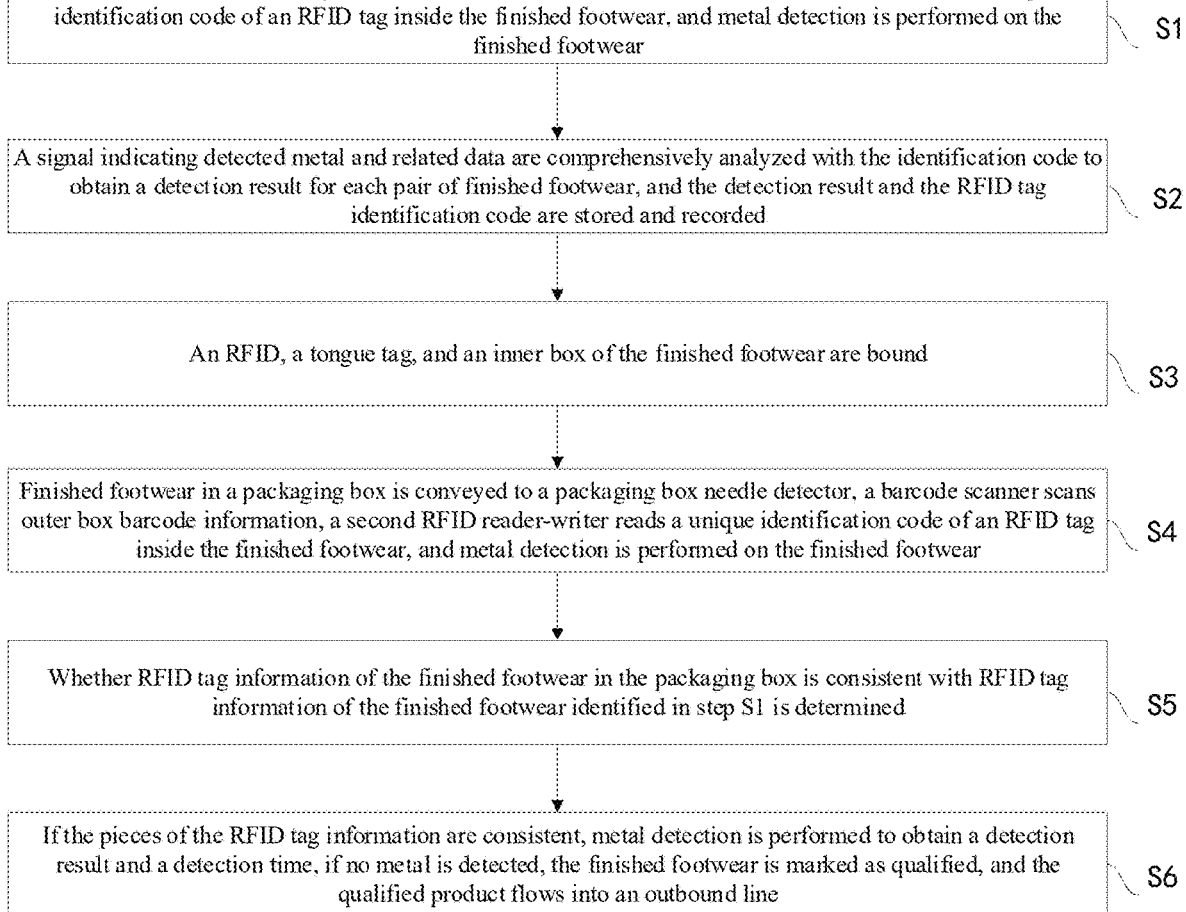

Finished footwear is conveyed to a footwear needle detector, a first RFID reader-writer reads a unique identification code of an RFID tag inside the finished footwear, and metal detection is performed on the finished footwear — S1

A signal indicating detected metal and related data are comprehensively analyzed with the identification code to obtain a detection result for each pair of finished footwear, and the detection result and the RFID tag identification code are stored and recorded — S2

An RFID, a tongue tag, and an inner box of the finished footwear are bound — S3

Finished footwear in a packaging box is conveyed to a packaging box needle detector, a barcode scanner scans outer box barcode information, a second RFID reader-writer reads a unique identification code of an RFID tag inside the finished footwear, and metal detection is performed on the finished footwear — S4

Whether RFID tag information of the finished footwear in the packaging box is consistent with RFID tag information of the finished footwear identified in step S1 is determined — S5

If the pieces of the RFID tag information are consistent, metal detection is performed to obtain a detection result and a detection time, if no metal is detected, the finished footwear is marked as qualified, and the qualified product flows into an outbound line — S6

FIG. 10

RFID FINISHED FOOTWEAR QUALITY MANAGEMENT SYSTEM AND METHOD

CROSS-REFERENCE TO RELATED APPLICATIONS

This application claims priority to Chinese Patent Application No. 202510935373.6, filed on Jul. 8, 2025, the content of which is incorporated herein by reference in its entirety.

TECHNICAL FIELD

The present application pertains to the field of intelligent manufacturing and quality inspection technology, and specifically relates to an RFID finished footwear quality management system and method.

BACKGROUND

During the footwear production process, metal impurities such as broken needles or metal debris may remain in finished footwear. These metal impurities not only affect the quality and service life of the footwear but may also cause harm to consumers during wear. Conventional metal detection instruments, although capable of detecting metal, cannot accurately identify the specific footwear containing the detected metal, which is not conducive to subsequent sorting and processing and fails to meet the high-efficiency and high-precision production demands of modern shoe factories. With the widespread application of radio frequency identification (RFID) technology in the industrial sector, combining it with metal detection has become a new approach to addressing the above issues.

Therefore, an RFID finished footwear quality management system and method are provided.

SUMMARY

To address the above issues in the prior art, the present application provides an RFID finished footwear quality management system and method, where RFID technology is combined with metal detection technology to achieve rapid and accurate metal detection of finished footwear, precise positioning of finished footwear containing metal impurities, improved detection efficiency and accuracy, and reduced labor costs.

To achieve the above objectives, the present application provides the following technical solutions.

A first aspect of the present application provides the RFID finished footwear quality management system, including:

a footwear needle detector module, configured to identify RFID tag information of each shoe or each pair of shoes, and perform metal detection to obtain a detection result and a detection time;

a small package verification module, configured to read RFID tag information of a pair of shoes, tongue tag information, and inner shoe box barcode information, and bind the RFID tag information of the pair of shoes, the tongue tag information, and the inner shoe box barcode information; and a packaging box needle detector module, configured to scan an outer box code to record packaging box label information, read RFID tag information of each shoe or each pair of shoes within a packaging box, determine whether the RFID tag information of each shoe or each pair of shoes within the packaging box is consistent with the RFID tag information of each shoe or each pair of shoes identified by the footwear needle detector module, perform metal detection to obtain a detection result and a detection time, and allow a qualified product to flow into an outbound line.

Preferably, the footwear needle detector module includes a first metal detection unit and a first metal detection terminal unit, where the first metal detection unit is configured to perform metal detection on each shoe or each pair of shoes; and transmit a signal indicating detected metal and related data to a central processing unit if a metal impurity is detected, or transmit a signal indicating no metal if no metal is detected; and the first metal detection terminal unit includes:

a first RFID read-write unit, configured to read a unique identification code of an RFID tag of each shoe or each pair of shoes and transmit the identification code information to a first central processing unit;

the first central processing unit, configured to perform comprehensive analysis after receiving information from the first metal detection unit and the first RFID read-write unit, and also configured to store and manage timing correction records of a footwear needle detector or a packaging box needle detector and generate a detection report;

a first communication conversion unit, configured to implement data transmission and communication connection between the first metal detection unit and the first central processing unit; and a first detection and recognition correction unit, configured to correct a detection channel number in the first metal detection unit before operation.

Preferably, the first metal detection unit includes a first conveyor apparatus and a first detection apparatus, where the first conveyor apparatus consists of a first conveyor belt and a first frame, the first detection apparatus is mounted across mounting plates on two sides of the first frame, the first conveyor belt passes through the first detection apparatus, detection assemblies are arranged in parallel on the first detection apparatus, the detection assembly consists of a first channel detection indicator light and a first magnetic steel coil, a first metal detection terminal unit is disposed on a side surface of the first detection apparatus, and a first alarm light and a first buzzer are mounted on an upper end surface of the first detection apparatus; and the first RFID read-write unit includes a first RFID reader-writer and a first RFID reader-writer fixing bracket, the first RFID reader-writer is mounted on the first RFID reader-writer fixing bracket, and the first RFID reader-writer fixing bracket is fixed on the first frame below the first conveyor belt.

Preferably, the packaging box needle detector module includes a second metal detection unit and a second metal detection terminal unit, where the second metal detection unit is configured to perform metal detection on each shoe or each pair of shoes; and transmit a signal indicating detected metal and related data to a second central processing unit if a metal impurity is detected, or transmit a signal indicating no metal if no metal is detected; and the second metal detection terminal unit includes:

a second RFID read-write unit, configured to read a unique identification code of an RFID tag of each shoe or each pair of shoes, scan the outer box code to record the packaging box label information, and transmit the identification code and the packaging box label information to the second central processing unit;

the second central processing unit, configured to perform comprehensive analysis after receiving information from the second metal detection unit and the second RFID read-write unit, and also configured to store and manage timing correction records of a footwear needle detector or a packaging box needle detector and generate a detection report;

a second communication conversion unit, configured to implement data transmission and communication connection between the second metal detection unit and the second central processing unit; and a second detection and recognition correction unit, configured to correct a detection channel number in the second metal detection unit before operation.

Preferably, the second metal detection unit includes a second conveyor apparatus and a second detection apparatus, where the second conveyor apparatus consists of a second conveyor belt and a second frame, the second detection apparatus is mounted across mounting plates on two sides of the second frame, the second conveyor belt passes through the second detection apparatus, detection assemblies are arranged in parallel on the second detection apparatus, the detection assembly consists of a second channel detection indicator light and a second magnetic steel coil, a second metal detection terminal unit is disposed on one side surface of the second detection apparatus, and a second alarm light and a second buzzer are mounted on an upper end surface of the second detection apparatus; and the second RFID read-write unit includes a second RFID reader-writer, a second RFID reader-writer fixing bracket, and a barcode scanner, the second RFID reader-writer is mounted on the second RFID reader-writer fixing bracket, and the second RFID reader-writer fixing bracket is fixed on the second frame below the second conveyor belt.

A second aspect of the present application provides the RFID finished footwear quality management method, including the following stages:

a footwear needle detector stage:

step S1: conveying finished footwear to a footwear needle detector, reading, by a first RFID reader-writer, a unique identification code of an RFID tag inside the finished footwear, and performing metal detection on the finished footwear;

step S2: comprehensively analyzing a signal indicating detected metal and related data with the identification code to obtain a detection result for each pair of finished footwear, and storing and recording the detection result and the RFID tag identification code;

a small package verification stage; and step S3: binding an RFID, a tongue tag, and an inner box of the finished footwear;

a packaging box needle detector stage:

step S4: conveying finished footwear in a packaging box to a packaging box needle detector, scanning, by a barcode scanner, outer box barcode information, reading, by a second RFID reader-writer, a unique identification code of an RFID tag inside the finished footwear, and performing metal detection on the finished footwear;

step S5: determining whether RFID tag information of the finished footwear in the packaging box is consistent with RFID tag information of the finished footwear identified in step S1; and step S6: if the pieces of the RFID tag information are consistent, performing metal detection to obtain a detection result and a detection time, if no metal is detected, marking the finished footwear as qualified, and allowing the qualified product to flow into an outbound line.

Preferably, in step S1, if metal is detected in the finished footwear, the RFID tag identification code corresponding to the finished footwear is marked as unqualified, and related detection information is recorded; or if no metal is detected, the RFID tag identification code is marked as qualified.

Preferably, in step S1, a first central processing unit sends a heartbeat command packet to a first communication conversion unit via a serial port;

in absence of a correction function, a start-stop button of the footwear needle detector is pressed, and a start-stop signal is transmitted to the first communication conversion unit;

the first communication conversion unit emits a 500-ms pulse signal to the needle detector, thereby starting the footwear needle detector;

the footwear needle detector outputs a forward rotation signal to a motor via the first communication conversion unit, the motor achieves forward rotation, and while the motor rotates forward, the needle detector outputs a green light signal, and the first communication conversion unit outputs a green alarm light drive signal, causing a first alarm light to display a green LED light; and when the footwear needle detector detects a magnetic metal foreign object, the footwear needle detector outputs a reverse rotation signal to the motor via the first communication conversion unit, the motor achieves reverse rotation, and while the motor rotates in reverse, the footwear needle detector outputs a red alarm signal and a buzzer signal, and the first communication conversion unit outputs a red alarm light drive signal and a buzzer drive signal, causing the first alarm light to display a red LED light and the buzzer to sound an alert indicating detection of a foreign object.

Preferably, in step S2, for a qualified product, a first RFID reader-writer writes a qualified identifier, and for an unqualified product, the first RFID reader-writer writes an unqualified identifier and detailed detection information.

Preferably, in step S6, a second central processing unit sends a heartbeat command packet to a second communication conversion unit via a serial port;

in absence of a correction function, a start-stop button of the footwear needle detector is pressed, and a start-stop signal is transmitted to the second communication conversion unit;

the second communication conversion unit emits a 500-ms pulse signal to the needle detector, thereby starting the footwear needle detector;

the footwear needle detector outputs a forward rotation signal to a motor via the second communication conversion unit, the motor achieves forward rotation, and while the motor rotates forward, the needle detector outputs a green light signal, and the second communication conversion unit outputs a green alarm light drive signal, causing a second alarm light to display a green LED light; and when the footwear needle detector detects a magnetic metal foreign object, the footwear needle detector outputs a reverse rotation signal to the motor via the second communication conversion unit, the motor achieves reverse rotation, and while the motor rotates in reverse, the footwear needle detector outputs a red alarm signal and a buzzer signal, and the second communication conversion unit outputs a red alarm light drive signal and a buzzer drive signal, causing the second alarm light to display a red LED light and the buzzer to sound an alert indicating detection of a foreign object.

Compared with the prior art, the present application has the following beneficial effects.

Through an automated conveying and detection process, along with the feature of RFID technology rapidly identifying finished footwear, the present application achieves continuous and rapid detection of finished footwear, significantly improving detection efficiency compared to conventional manual detection methods, and meeting the demands of large-scale production in shoe factories.

Via combining the unique identification code of the RFID tag with the metal detection result, the specific finished footwear containing metal impurities can be accurately determined, facilitating precise handling of problematic footwear by staff and avoiding the drawback of conventional detection methods that cannot position specific defective products.

The high-sensitivity metal detectors can detect minute metal impurities, while the central processing units comprehensively analyze and process multiple pieces of information, further improving the detection accuracy, and reducing the possibility of false detections and missed detections.

Detection information for each pair of finished footwear is stored and recorded, allowing production managers to access relevant data to understand product quality, conduct quality traceability and analysis, which is conducive to optimizing production processes and improving product quality.

BRIEF DESCRIPTION OF THE DRAWINGS

The drawings are provided to facilitate a further understanding of the present application, form a part of the specification, and, together with the embodiments of the present application, serve to explain the present application without limiting it.

FIG. 10 is a flowchart of an RFID finished footwear quality management method according to the present application.

DETAILED DESCRIPTION OF THE EMBODIMENTS

The technical solutions in the embodiments of the present application will be clearly and completely described below with reference to the drawings in the embodiments of the present application. It is evident that the described embodiments are only some embodiments of the present application, not all embodiments. Based on the embodiments in the present application, all other embodiments obtained by those of ordinary skill in the art without creative effort fall within the protection scope of the present application.

Figure 1:
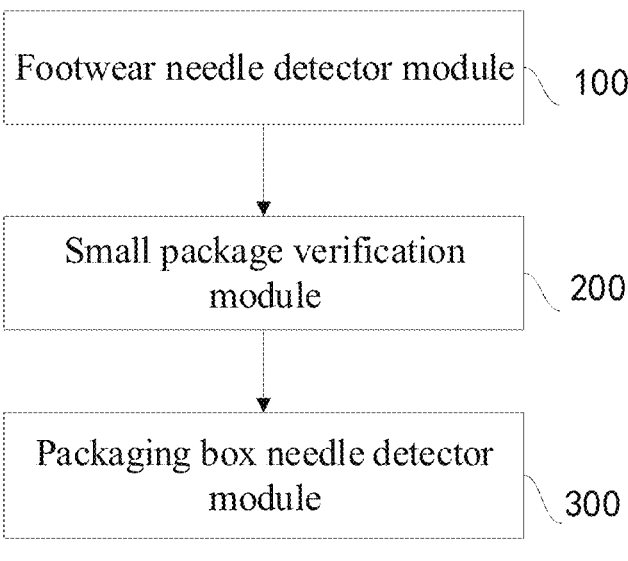
FIG. 1 is a module diagram of an RFID finished footwear quality management system according to the present application.

As shown in FIG. 1, an RFID finished footwear quality management system is provided, including a footwear needle detector module 100, a small package verification module 200, and a packaging box needle detector module 300.

In an embodiment, the model of a footwear needle detector is HD-5016TD, the model of a small package verification system is PCA-300, and the model of a packaging box needle detector is HD-900TD.

The footwear needle detector module 100 is configured to identify RFID tag information of each shoe or each pair of shoes and perform metal detection to obtain a detection result and a detection time.

As shown in FIGS. 2 to 5, the footwear needle detector module 100 includes a first metal detection unit 1 and a first metal detection terminal unit 2, where the first metal detection unit 1 is configured to perform metal detection on each shoe or each pair of shoes; and transmit a signal indicating detected metal and related data to a central processing unit 202 if a metal impurity is detected, or transmit a signal indicating no metal if no metal is detected; and the first metal detection terminal unit 2 includes:

a first RFID read-write unit 204, configured to read a unique identification code of an RFID tag of each shoe or each pair of shoes and transmit the identification code information to a first central processing unit 202;

the first central processing unit 201, configured to perform comprehensive analysis after receiving information from the first metal detection unit 1 and the first RFID read-write unit 204, and also configured to store and manage timing correction records of a footwear needle detector or a packaging box needle detector and generate a detection report;

a first communication conversion unit 202, configured to implement data transmission and communication connection between the first metal detection unit 1 and the first central processing unit 201; and a first detection and recognition correction unit 203, configured to correct a detection channel number in the first metal detection unit 1 before operation.

As shown in FIGS. 2 to 5, the first metal detection unit 1 includes a first conveyor apparatus 102 and a first detection apparatus 103, where the first conveyor apparatus 102 consists of a first conveyor belt 1021 and a first frame 1022, and the first detection apparatus 103 is mounted across mounting plates on two sides of the first frame 1022. The first conveyor belt 1021 passes through the first detection apparatus 103, and detection assemblies are arranged in parallel on the first detection apparatus 103. The detection assembly consists of a first channel detection indicator light 1031 and a first magnetic steel coil, which generates magnetic field lines when powered. When metal passes through the magnetic field lines, it cuts the magnetic field lines. In this case, information is output, and the first channel detection indicator light 1031 lights up. A first metal detection terminal unit 2 is disposed on a side surface of the first detection apparatus 103, and a first alarm light 3 and a first buzzer are mounted on an upper end surface of the first detection apparatus 103.

The first RFID read-write unit 204 includes a first RFID reader-writer 2041 and a first RFID reader-writer fixing bracket 2042, the first RFID reader-writer 2041 is mounted on the first RFID reader-writer fixing bracket 2042, and the first RFID reader-writer fixing bracket 2042 is fixed on the first frame 1022 below the first conveyor belt 1021, where the mounting method of the first RFID reader-writer 2041 includes, but is not limited to, the above method.

The small package verification module 200 is configured to read RFID tag information of a pair of shoes, tongue tag information, and inner shoe box barcode information, and bind the RFID tag information of the pair of shoes, the tongue tag information, and the inner shoe box barcode information.

The packaging box needle detector module 300 is configured to scan an outer box code to record packaging box label information, read RFID tag information of each shoe or each pair of shoes within a packaging box, determine whether the RFID tag information of each shoe or each pair of shoes within the packaging box is consistent with the RFID tag information of each shoe or each pair of shoes identified by the footwear needle detector module, perform metal detection to obtain a detection result and a detection time, and allow a qualified product to flow into an outbound line.

As shown in FIGS. 6 to 9, the packaging box needle detector module 300 includes a second metal detection unit 4 and a second metal detection terminal unit 5, where the second metal detection unit 4 is configured to perform metal detection on each shoe or each pair of shoes; and transmit a signal indicating detected metal and related data to a second central processing unit 501 if a metal impurity is detected, or transmit a signal indicating no metal if no metal is detected; and the second metal detection terminal unit 5 includes:

a second RFID read-write unit 504, configured to read a unique identification code of an RFID tag of each shoe or each pair of shoes, scan the outer box code to record the packaging box label information, and transmit the identification code and the packaging box label information to the second central processing unit 501;

the second central processing unit 501, configured to perform comprehensive analysis after receiving information from the second metal detection unit 4 and the second RFID read-write unit 504, and also configured to store and manage timing correction records of a footwear needle detector or a packaging box needle detector and generate a detection report;

a second communication conversion unit 502, configured to implement data transmission and communication connection between the second metal detection unit 4 and the second central processing unit 501; and a second detection and recognition correction unit 503, configured to correct a detection channel number in the second metal detection unit 4 before operation.

As shown in FIGS. 6 to 9, the second metal detection unit 4 includes a second conveyor apparatus 402 and a second detection apparatus 403.

The second conveyor apparatus 402 consists of a second conveyor belt 4021 and a second frame 4022, the second detection apparatus 403 is mounted across mounting plates on two sides of the second frame 4022, and the second conveyor belt 4021 passes through the second detection apparatus 403. Detection assemblies are arranged in parallel on the second detection apparatus 403, and the detection assembly consists of a second channel detection indicator light 4031 and a second magnetic steel coil, which generates magnetic field lines when powered. When metal passes through the magnetic field lines, it cuts the magnetic field lines. In this case, information is output, and the second channel detection indicator light 4031 lights up. A second metal detection terminal unit 5 is disposed on one side surface of the second detection apparatus 403, and a second alarm light 6 and a second buzzer are mounted on an upper end surface of the second detection apparatus 403.

The second RFID read-write unit 504 includes a second RFID reader-writer 5041, a second RFID reader-writer fixing bracket 5042, and a barcode scanner 7, the second RFID reader-writer 5041 is mounted on the second RFID reader-writer fixing bracket 5042, and the second RFID reader-writer fixing bracket 5042 is fixed on the second frame 4022 below the second conveyor belt 4021, where the mounting method of the second RFID reader-writer 5041 includes, but is not limited to, the above method.

In an embodiment, the RFID finished footwear quality management system further includes a central database residing on a client, configured to store needle detection records for all production lines of the footwear needle detector and the packaging box needle detector, where the client includes, but is not limited to, user terminals such as mobile phones and computers.

As shown in FIGS. 5, 7, 9, and 10, an RFID finished footwear quality management method is provided, including the following stages:

A footwear needle detector stage:

Step S1: finished footwear is conveyed to a footwear needle detector, a first RFID reader-writer 2041 reads a unique identification code of an RFID tag inside the finished footwear, and metal detection is performed on the finished footwear.

In an embodiment, if metal is detected in the finished footwear, the RFID tag identification code corresponding to the finished footwear is marked as unqualified, and related detection information is recorded; or if no metal is detected, the RFID tag identification code is marked as qualified.

Figure 2:
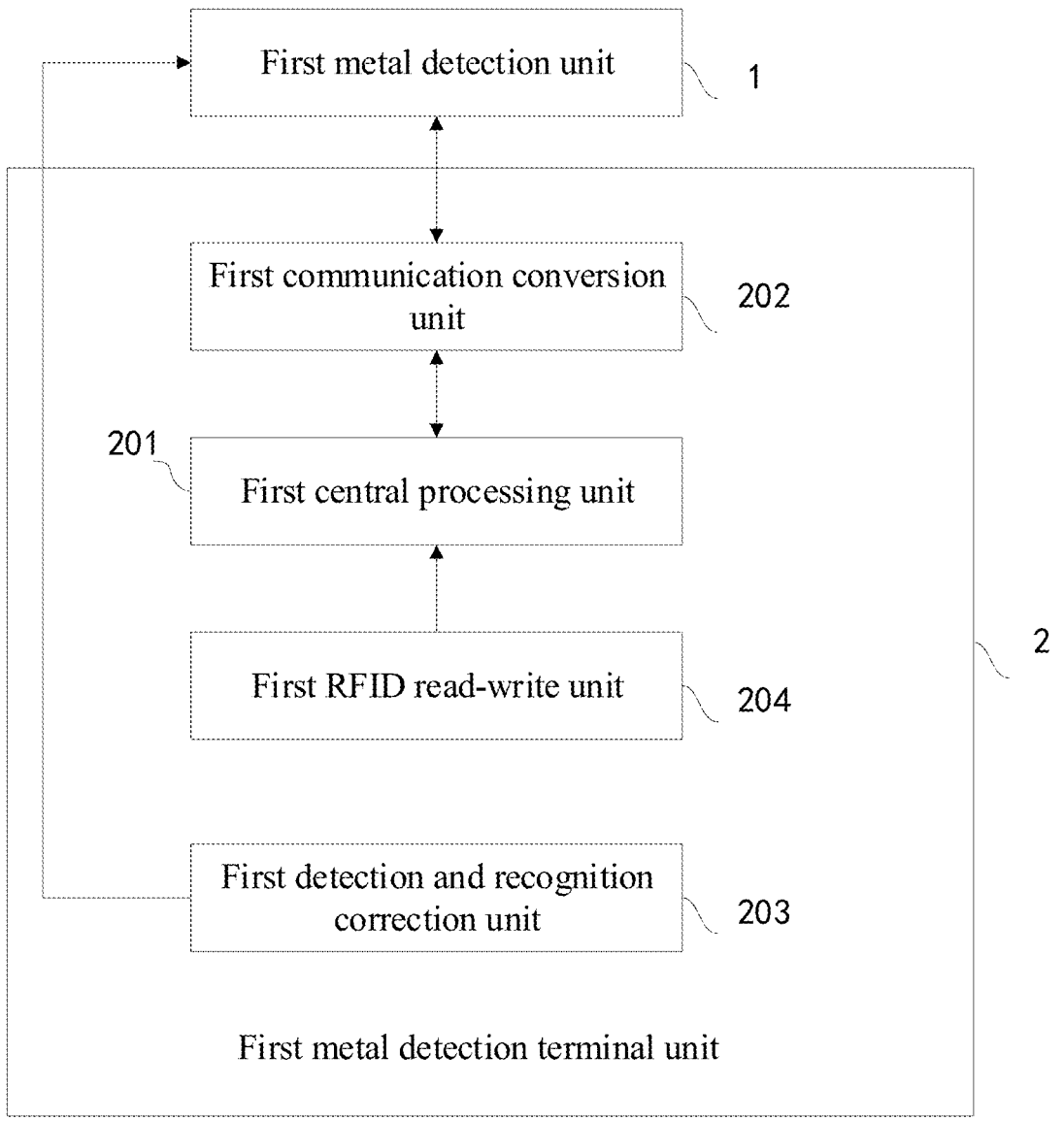
FIG. 2 is a specific module diagram of a footwear needle detector module according to the present application.
Figure 3:
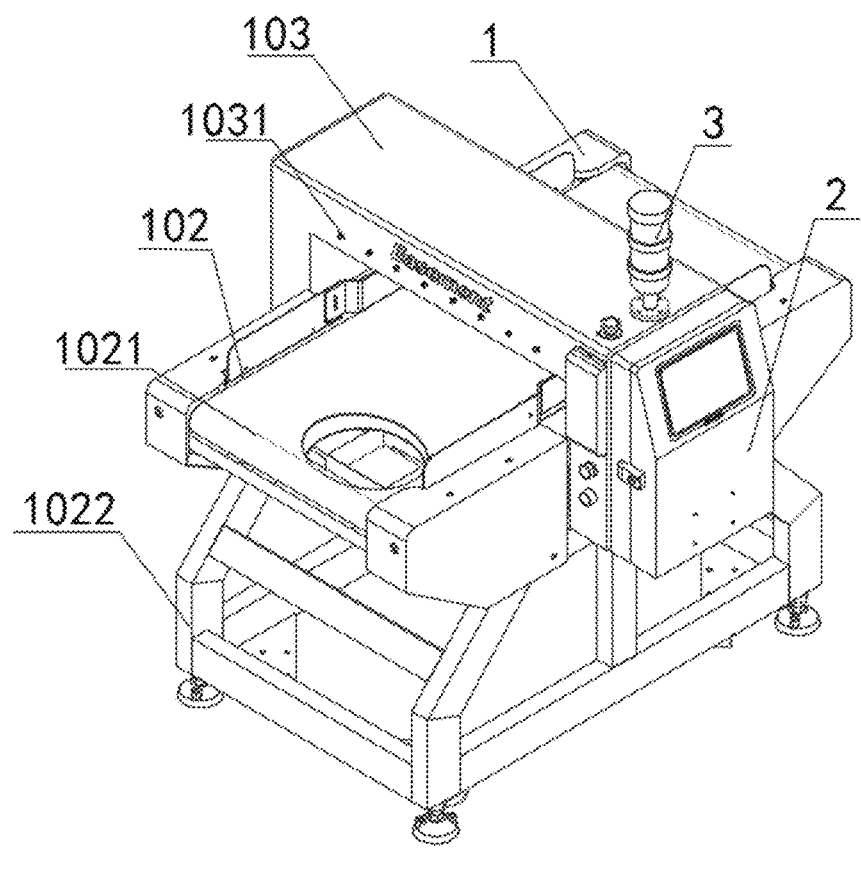
FIG. 3 is a schematic structural diagram of a first metal detection unit and a first metal detection terminal unit according to the present application.
Figure 4:
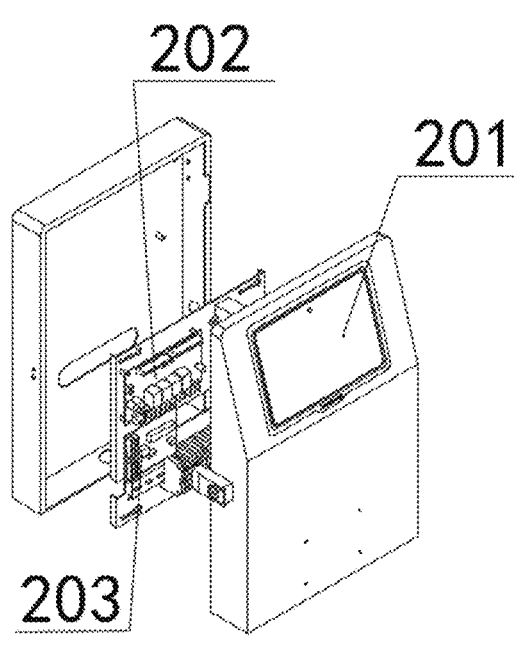
FIG. 4 is a schematic structural diagram of the first metal detection terminal unit on a footwear needle detector according to the present application.
Figure 5:
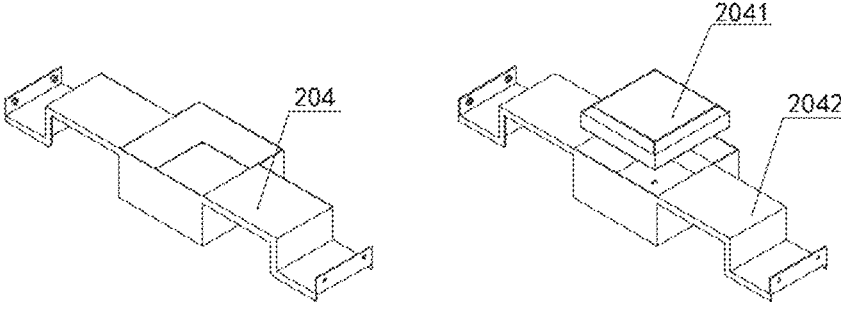
FIG. 5 is a schematic structural diagram of a first RFID read-write unit according to the present application.

As shown in FIGS. 2 to 4, a first central processing unit 201 sends a heartbeat command packet to a first communication conversion unit 202 via a serial port;

in absence of a correction function, a start-stop button of the footwear needle detector is pressed, and a start-stop signal is transmitted to the first communication conversion unit 202;

the first communication conversion unit 202 emits a 500-ms pulse signal to the needle detector, thereby starting the footwear needle detector;

the footwear needle detector outputs a forward rotation signal to a motor via the first communication conversion unit 202, the motor achieves forward rotation, and while the motor rotates forward, the needle detector outputs a green light signal, and the first communication conversion unit 202 outputs a green alarm light drive signal, causing a first alarm light 3 to display a green LED light; and when the footwear needle detector detects a magnetic metal foreign object, the footwear needle detector outputs a reverse rotation signal to the motor via the first communication conversion unit 202, the motor achieves reverse rotation, and while the motor rotates in reverse, the footwear needle detector outputs a red alarm signal and a buzzer signal, and the first communication conversion unit 202 outputs a red alarm light drive signal and a buzzer drive signal, causing the first alarm light 3 to display a red LED light and the buzzer to sound an alert indicating detection of a foreign object.

Step S2: a signal indicating detected metal and related data are comprehensively analyzed with the identification code to obtain a detection result for each pair of finished footwear, and the detection result and the RFID tag identification code are stored and recorded.

In an embodiment, for a qualified product, a first RFID reader-writer 2041 writes a qualified identifier, and for an unqualified product, the first RFID reader-writer 2041 writes an unqualified identifier and detailed detection information.

A small package verification stage:

Step S3: an RFID, a tongue tag, and an inner box of the finished footwear are bound to achieve "three-code integration"; all this information is uploaded to a database by the system, laying the foundation for the digitization of later packaging box operations.

A packaging box needle detector stage:

Step S4: finished footwear in a packaging box is conveyed to a packaging box needle detector, a barcode scanner 7 scans outer box barcode information, a second RFID reader-writer 5041 reads a unique identification code of an RFID tag inside the finished footwear, and metal detection is performed on the finished footwear.

Step S5: whether RFID tag information of the finished footwear in the packaging box is consistent with RFID tag information of the finished footwear identified in step S1 is determined.

Step S6: if the pieces of the RFID tag information are consistent, metal detection is performed to obtain a detection result and a detection time, if no metal is detected, the finished footwear is marked as qualified, and the qualified product flows into an outbound line.

Figure 6:
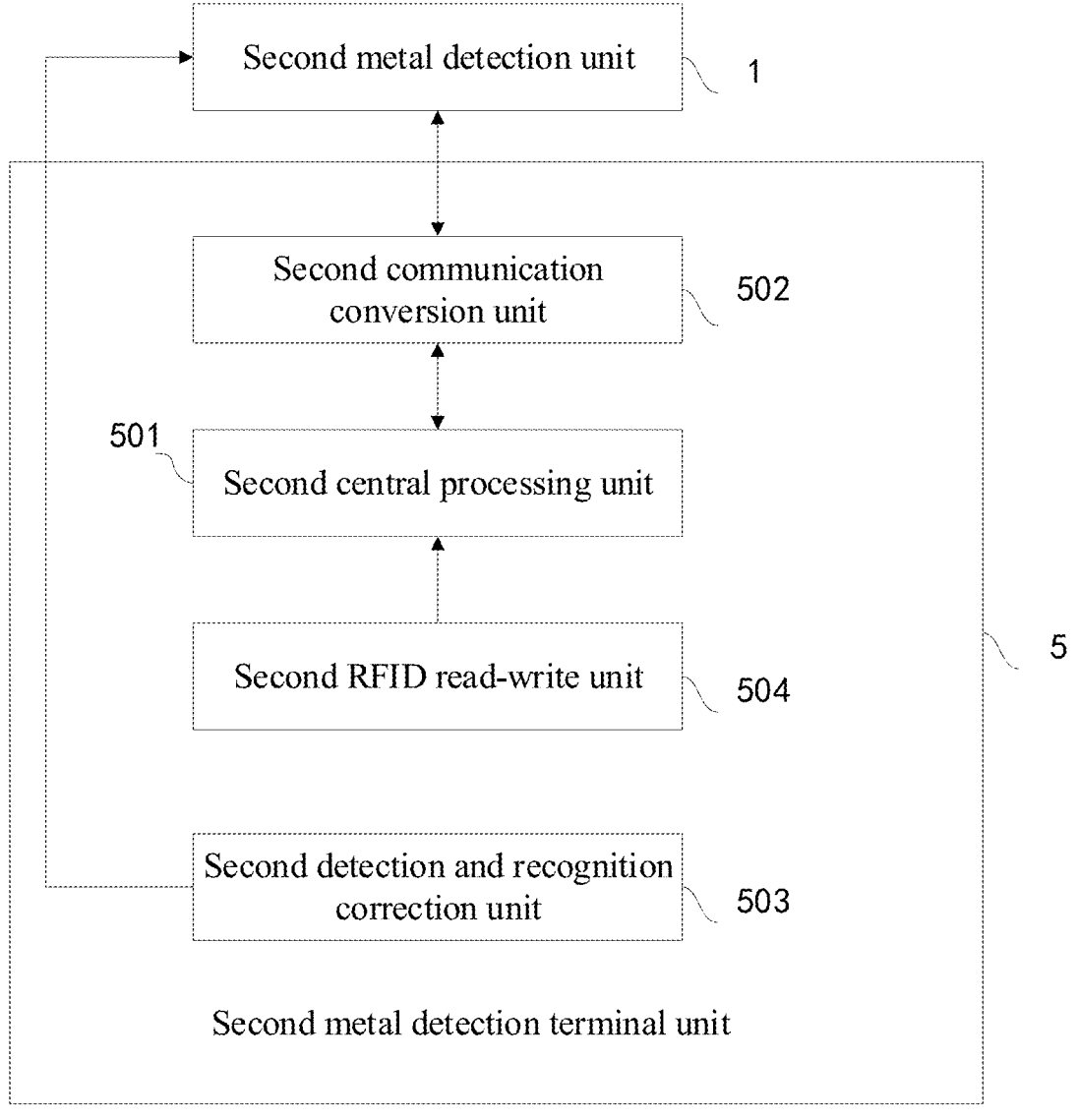
FIG. 6 is a specific module diagram of a packaging box needle detector module according to the present application.
Figure 7:
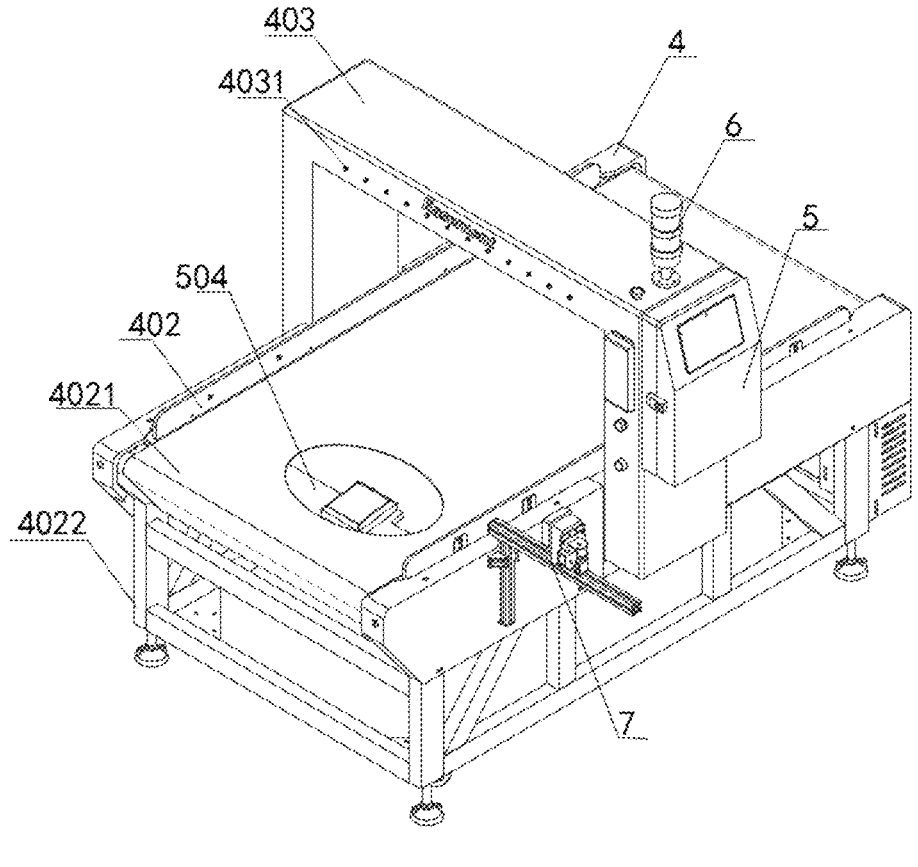
FIG. 7 is a schematic structural diagram of a second metal detection unit and a second metal detection terminal unit according to the present application.
Figure 8:
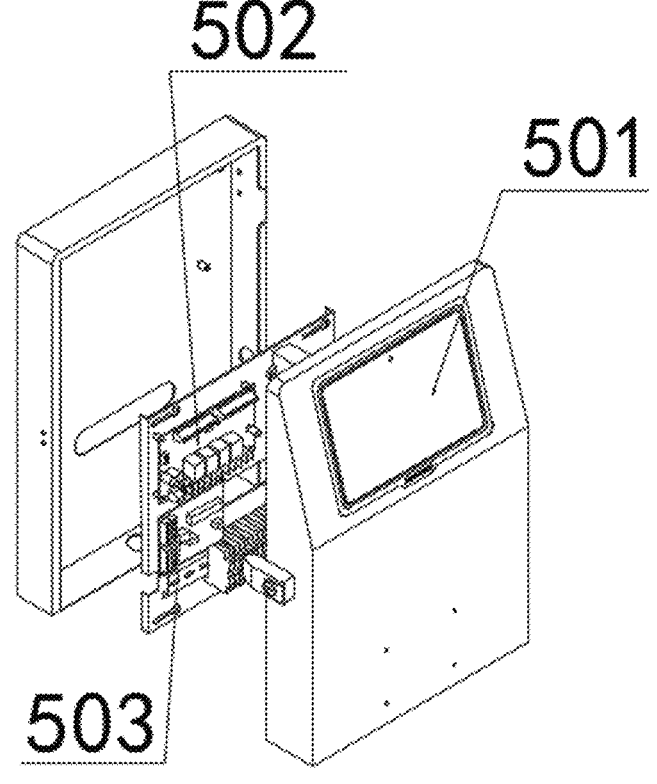
FIG. 8 is a schematic structural diagram of the second metal detection terminal unit on a packaging box needle detector according to the present application.
Figure 9:
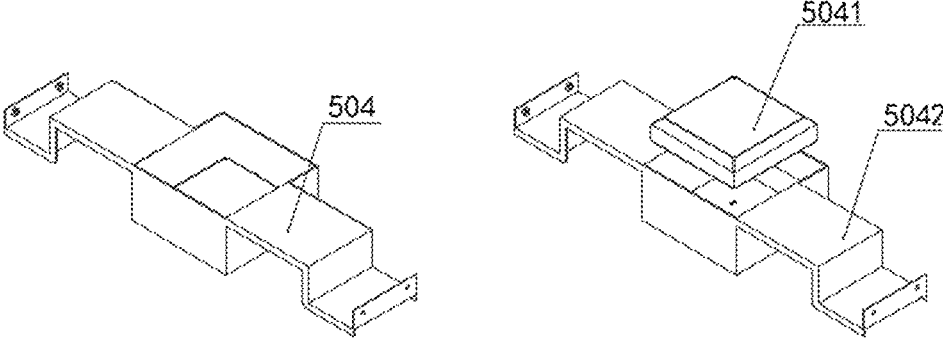
FIG. 9 is a schematic structural diagram of a second RFID read-write unit according to the present application.

As shown in FIGS. 6 to 8, a second central processing unit 501 sends a heartbeat command packet to a second communication conversion unit 502 via a serial port;

in absence of a correction function, a start-stop button of the footwear needle detector is pressed, and a start-stop signal is transmitted to the second communication conversion unit 502;

the second communication conversion unit 502 emits a 500-ms pulse signal to the needle detector, thereby starting the footwear needle detector;

the footwear needle detector outputs a forward rotation signal to a motor via the second communication conversion unit 502, the motor achieves forward rotation, and while the motor rotates forward, the needle detector outputs a green light signal, and the second communication conversion unit 502 outputs a green alarm light drive signal, causing a second alarm light 6 to display a green LED light; and when the footwear needle detector detects a magnetic metal foreign object, the footwear needle detector outputs a reverse rotation signal to the motor via the second communication conversion unit 502, the motor achieves reverse rotation, and while the motor rotates in reverse, the footwear needle detector outputs a red alarm signal and a buzzer signal, and the second communication conversion unit 502 outputs a red alarm light drive signal and a buzzer drive signal, causing the second alarm light 6 to display a red LED light and the buzzer to sound an alert indicating detection of a foreign object.

It should be noted that the above are only preferred embodiments of the present application and are not intended to limit the present application. Although the present application has been described in detail with reference to the foregoing embodiments, those skilled in the art can still modify the technical solutions described in the foregoing embodiments or make equivalent substitutions for some technical features. Any modifications, equivalent substitutions, improvements, and the like made within the spirit and principles of the present application shall be included within the protection scope of the present application.

What is claimed is:

1. A radio frequency identification (RFID) finished footwear quality management system, comprising:

a footwear needle detector module, configured to identify RFID tag information of each shoe or each pair of shoes, and perform metal detection to obtain a detection result and a detection time;

a small package verification module, configured to read RFID tag information of a pair of shoes, tongue tag information, and inner shoe box barcode information, and bind the RFID tag information of the pair of shoes, the tongue tag information, and the inner shoe box barcode information; and a packaging box needle detector module, configured to scan an outer box code to record packaging box label information, read RFID tag information of each shoe or each pair of shoes within a packaging box, determine whether the RFID tag information of each shoe or each pair of shoes within the packaging box is consistent with the RFID tag information of each shoe or each pair of shoes identified by the footwear needle detector module, perform metal detection to obtain a detection result and a detection time, and allow a qualified product to flow into an outbound line.

2. The RFID finished footwear quality management system according to claim 1, wherein the footwear needle detector module comprises a first metal detection unit and a first metal detection terminal unit;

the first metal detection unit is configured to perform metal detection on each shoe or each pair of shoes, and transmit a signal indicating detected metal and related data to a central processing unit if a metal impurity is detected, or transmit a signal indicating no metal if no metal is detected; and the first metal detection terminal unit comprises:

a first RFID read-write unit, configured to read a unique identification code of an RFID tag of each shoe or each pair of shoes and transmit the identification code information to a first central processing unit;

the first central processing unit, configured to perform comprehensive analysis after receiving information from the first metal detection unit and the first RFID read-write unit, and configured to store and manage timing correction records of a footwear needle detector or a packaging box needle detector and generate a detection report;

a first communication conversion unit, configured to implement data transmission and communication connection between the first metal detection unit and the first central processing unit; and a first detection and recognition correction unit, configured to correct a detection channel number in the first metal detection unit before operation.

3. The RFID finished footwear quality management system according to claim 2, wherein the first metal detection unit comprises a first conveyor apparatus and a first detection apparatus;

the first conveyor apparatus comprises a first conveyor belt and a first frame, the first detection apparatus is mounted across mounting plates on two sides of the first frame, the first conveyor belt passes through the first detection apparatus, detection assemblies are arranged in parallel on the first detection apparatus, the detection assembly comprises a first channel detection indicator light and a first magnetic steel coil, a first metal detection terminal unit is disposed on a side surface of the first detection apparatus, and a first alarm light and a first buzzer are mounted on an upper end surface of the first detection apparatus; and the first RFID read-write unit comprises a first RFID reader-writer and a first RFID reader-writer fixing bracket, the first RFID reader-writer is mounted on the first RFID reader-writer fixing bracket, and the first RFID reader-writer fixing bracket is fixed on the first frame below the first conveyor belt.

4. The RFID finished footwear quality management system according to claim 1, wherein the packaging box needle detector module comprises a second metal detection unit and a second metal detection terminal unit;

the second metal detection unit is configured to perform metal detection on each shoe or each pair of shoes, and transmit a signal indicating detected metal and related data to a second central processing unit if a metal impurity is detected, or transmit a signal indicating no metal if no metal is detected; and the second metal detection terminal unit comprises:

a second RFID read-write unit, configured to read a unique identification code of an RFID tag of each shoe or each pair of shoes, scan the outer box code to record the packaging box label information, and transmit the identification code and the packaging box label information to the second central processing unit;

the second central processing unit, configured to perform comprehensive analysis after receiving information from the second metal detection unit and the second RFID read-write unit, and configured to store and manage timing correction records of a footwear needle detector or a packaging box needle detector and generate a detection report;

a second communication conversion unit, configured to implement data transmission and communication connection between the second metal detection unit and the second central processing unit; and a second detection and recognition correction unit, configured to correct a detection channel number in the second metal detection unit before operation.

5. The RFID finished footwear quality management system according to claim 4, wherein the second metal detection unit comprises a second conveyor apparatus and a second detection apparatus;

the second conveyor apparatus comprises a second conveyor belt and a second frame, the second detection apparatus is mounted across mounting plates on two sides of the second frame, the second conveyor belt passes through the second detection apparatus, detection assemblies are arranged in parallel on the second detection apparatus, the detection assembly comprises a second channel detection indicator light and a second magnetic steel coil, a second metal detection terminal unit is disposed on one side surface of the second detection apparatus, and a second alarm light and a second buzzer are mounted on an upper end surface of the second detection apparatus; and the second RFID read-write unit comprises a second RFID reader-writer, a second RFID reader-writer fixing bracket, and a barcode scanner, the second RFID reader-writer is mounted on the second RFID reader-writer fixing bracket, and the second RFID reader-writer fixing bracket is fixed on the second frame below the second conveyor belt.

6. An RFID finished footwear quality management method, comprising:

step S1: conveying finished footwear to a footwear needle detector, reading, by a first RFID reader-writer, a unique identification code of an RFID tag inside the finished footwear, and performing metal detection on the finished footwear;

step S2: comprehensively analyzing a signal indicating detected metal and related data with the identification code to obtain a detection result for each pair of finished footwear, and storing and recording the detection result and the RFID tag identification code;

step S3: binding an RFID, a tongue tag, and an inner box of the finished footwear;

step S4: conveying finished footwear in a packaging box to a packaging box needle detector, scanning, by a barcode scanner, outer box barcode information, reading, by a second RFID reader-writer, a unique identification code of an RFID tag inside the finished footwear, and performing metal detection on the finished footwear;

step S5: determining whether RFID tag information of the finished footwear in the packaging box is consistent with RFID tag information of the finished footwear identified in step S1; and step S6: if the pieces of the RFID tag information are consistent, performing metal detection to obtain a detection result and a detection time, if no metal is detected, marking the finished footwear as qualified, and allowing the qualified product to flow into an outbound line.

7. The RFID finished footwear quality management method according to claim 6, wherein in step S1, if metal is detected in the finished footwear, the RFID tag identification code corresponding to the finished footwear is marked as unqualified, and related detection information is recorded; or if no metal is detected, the RFID tag identification code is marked as qualified.

8. The RFID finished footwear quality management method according to claim 6, wherein in step S1, a first central processing unit sends a heartbeat command packet to a first communication conversion unit via a serial port;

in absence of a correction function, a start-stop button of the footwear needle detector is pressed, and a start-stop signal is transmitted to the first communication conversion unit;

the first communication conversion unit emits a 500-ms pulse signal to the needle detector, thereby starting the footwear needle detector;

the footwear needle detector outputs a forward rotation signal to a motor via the first communication conversion unit, the motor achieves forward rotation, and while the motor rotates forward, the needle detector outputs a green light signal, and the first communication conversion unit outputs a green alarm light drive signal, causing a first alarm light to display a green light emitting diode (LED) light; and when the footwear needle detector detects a magnetic metal foreign object, the footwear needle detector outputs a reverse rotation signal to the motor via the first communication conversion unit, the motor achieves reverse rotation, and while the motor rotates in reverse, the footwear needle detector outputs a red alarm signal and a buzzer signal, and the first communication conversion unit outputs a red alarm light drive signal and a buzzer drive signal, causing the first alarm light to display a red LED light and the buzzer to sound an alert indicating detection of a foreign object.

9. The RFID finished footwear quality management method according to claim 6, wherein in step S2, for a qualified product, a first RFID reader-writer writes a qualified identifier, and for an unqualified product, the first RFID reader-writer writes an unqualified identifier and detailed detection information.

10. The RFID finished footwear quality management method according to claim 6, wherein in step S6, a second central processing unit sends a heartbeat command packet to a second communication conversion unit via a serial port;

in absence of a correction function, a start-stop button of the footwear needle detector is pressed, and a start-stop signal is transmitted to the second communication conversion unit;

the second communication conversion unit emits a 500-ms pulse signal to the needle detector, thereby starting the footwear needle detector;

the footwear needle detector outputs a forward rotation signal to a motor via the second communication conversion unit, the motor achieves forward rotation, and while the motor rotates forward, the needle detector outputs a green light signal, and the second communication conversion unit outputs a green alarm light drive signal, causing a second alarm light to display a green LED light; and when the footwear needle detector detects a magnetic metal foreign object, the footwear needle detector outputs a reverse rotation signal to the motor via the second communication conversion unit, the motor achieves reverse rotation, and while the motor rotates in reverse, the footwear needle detector outputs a red alarm signal and a buzzer signal, and the second communication conversion unit outputs a red alarm light drive signal and a buzzer drive signal, causing the second alarm light to display a red LED light and the buzzer to sound an alert indicating detection of a foreign object.

\* \* \* \* \*